UNITED STATES PATENT OFFICE.

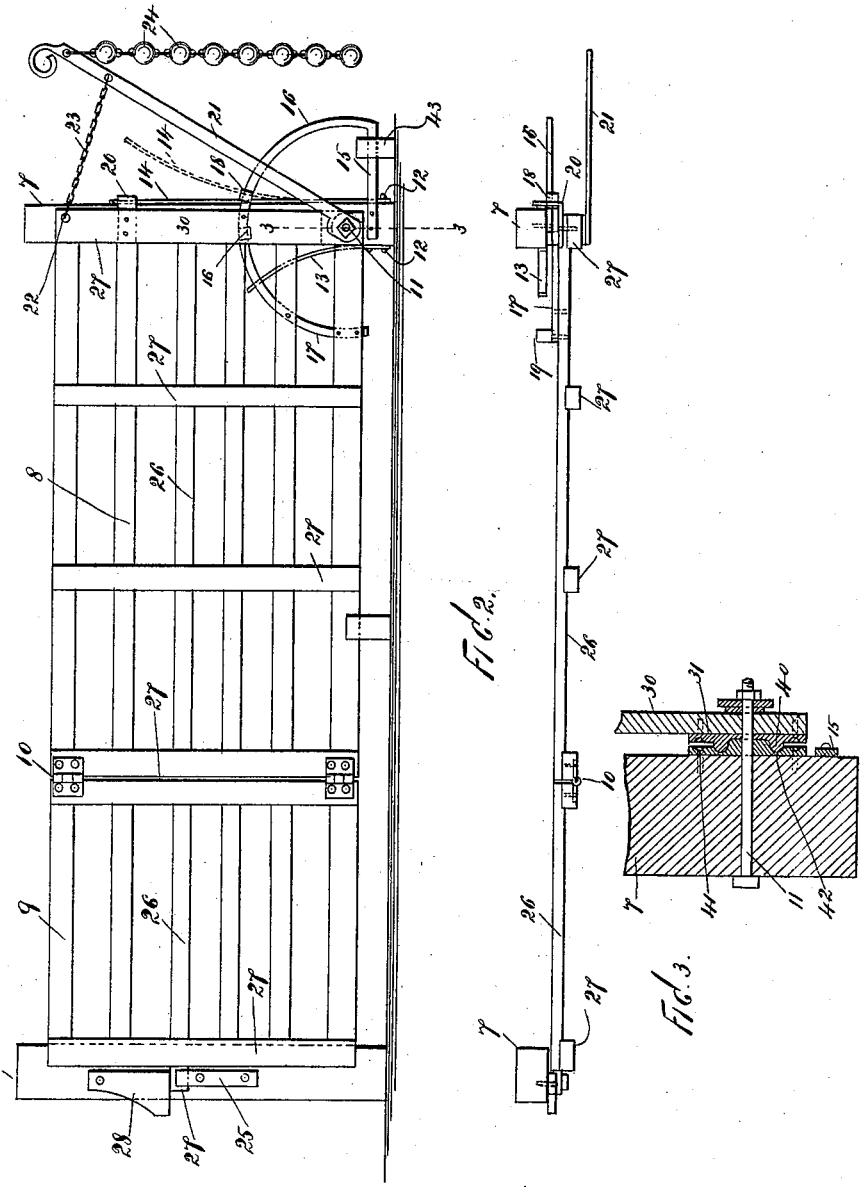

WILLIAM M. KENT, OF BUFFALO, NEW YORK.

GATE.

SPECIFICATION forming part of Letters Patent No. 629,509, dated July 25, 1899.

Application filed November 1, 1898. Serial No. 695,158. (No model.)

*To all whom it may concern:*

Be it known that I, WILLIAM M. KENT, a citizen of the United States, residing at Buffalo, in the county of Erie and State of New York, have invented certain new and useful Improvements in Gates, of which the following is a full and complete specification, such as will enable those skilled in the art to which it appertains to make and use the same.

This invention relates to gates; and the object thereof is to provide an improved device of this class which in opening in order to permit vehicles to pass is adapted to swing vertically and which is provided with a hinged section which may be opened or swung in the usual manner for the purpose of allowing pedestrians to pass.

The invention is fully disclosed in the following specification, of which the accompanying drawings form a part, in which—

Figure 1 is a front elevation of my improved gate. Fig. 2 is a plan view, and Fig. 3 a section on the line 3 3 of Fig. 1.

In the drawings forming part of this specification the separate parts of my improvement are designated by the same numerals of reference in each of the views, and in the practice of my invention I provide the usual posts 6 and 7 and the gate 8, which is provided with a hinged section 9, the section 9 being hinged to the main part of the gate at 10.

The gate 8 is pivoted to the post 7 at 11, and secured to the opposite sides of said post, near the bottom thereof, are strong plate-springs 13 and 14, the operation of which will be hereinafter described.

Secured to the post 7 at or near its bottom, and preferably to the front side thereof, is a horizontal arm 15, provided with a segmental plate 16, the upper end of which is secured to the post 7, and secured to the gate is a similar segmental plate 17, which, in connection with the segmental plate 16, forms a halfcircle, and each of the segmental plates 16 and 17 is provided at its end with a keeper or guide 18, through which the other segmental plate passes.

The lower end of the segmental plate 17 is provided with a transversely or horizontally arranged clip 19, which when the gate is lifted on its pivot 11 strikes the upper end of the spring 13, and secured to the upper portion of the end of the gate directly over its pivotal support at 11 is an angular clip or catch 20, which operates in connection with the spring 14, as hereinafter described.

Pivotally mounted on the pivotal support of the gate at 11 is a lever-arm 21, the upper end of which is connected with the upper part of the gate at 22 by a chain or similar device 23, and suspended from the upper end of said lever-arm are a plurality of weights 24, which may be connected by links or in any desired manner.

Secured to the post 6 is a latch 25, and the end of one of the horizontal bars 26 of the gate is projected to form an extension 27, which operates in connection with said latch, and immediately above said latch is a pivoted lock-catch 28, which is adapted to hang in the position shown in Fig. 1 and to prevent the lifting of the gate on its pivotal support at 11, and when it is desired to open the hinged section 9 of the gate or to swing the gate on its pivotal support the lock-catch 28 is swung outward and the end of the gate slightly raised, when the hinged section 9 thereof may be swung on its hinges at 10, or the entire gate may be lifted on its pivotal support at 11.

The object of the lever-arm 21 and the weight 24 is to assist in raising the gate on its pivotal support, and in this operation the angular clip 19 strikes the spring 13, which operates to ease the backward movement of the gate as it swings vertically and to cause the gate to come gradually to a stop in the vertical position, and in this operation the spring 14 springs outward into the position shown in dotted lines in Fig. 1, and in the operation of lowering the gate into the position shown in full lines in Fig. 1 the angular clip 20 catches the spring 14 and draws it inwardly into contact with the post 7, as shown in full lines in said figure, and the spring 14 thus operates to prevent the gate dropping suddenly and causes it to fall gradually into position. It will also be observed that the angular clip 20 serves, in connection with the post 7, to hold the gate in proper horizontal position, and blocks or other supports may be placed under the free end thereof in the usual manner.

The vertical end bar 30 of the gate, through which the pivot-bolt 11 passes, is provided on its inner side with a metal plate 31, having an annular rib 40, and the gate-post 7 is provided with a similar plate 41, having an annular groove 42, which receives the rib 40, and the bolt 11 passes centrally through said plates 31 and 41, and by this construction I provide a hinge which strengthens the gate and provides a perfect pivotal bearing therefor. A vertical post or standard 43 is also secured in the ground adjacent to the arm 15, which steadies said arm and prevents it from swinging laterally, and the movable portion 9 of the gate may be made so as to slide on the main portion thereof instead of being hinged thereto, as shown and described.

My improved gate is composed of the horizontal bars 26 and vertical cross bars or braces 27; but the gate proper may be constructed in any desired manner, and it will be apparent that many changes in and modifications of the construction described may be made without departing from the spirit of my invention or sacrificing its advantages.

Having fully described my invention, I claim as new and desire to secure by Letters Patent—

1. The combination with suitable gate-posts, of a gate pivoted at one of its lower corners to one of said posts, and adapted to swing vertically, a segmental plate provided with an angular clip and secured to said post and projecting in a direction opposite to that of the gate, a corresponding segmental plate secured to the gate and provided at its outer end with a guide-clip through which the first-named segmental plate passes, and strong springs secured to the opposite sides of said posts, in connection with one of which the last-named clip operates, the gate being also provided above its pivotal support with a clip, substantially as shown and described.

2. The combination with suitable gate-posts, of a gate pivoted at one of its lower corners to one of said posts, and adapted to swing vertically, a segmental plate provided with an angular clip and secured to said post and projecting in a direction opposite to that of the gate, a corresponding segmental plate secured to the gate and provided at its outer end with a guide-clip through which the first-named segmental plate passes, strong springs secured to the opposite sides of said posts, in connection with one of which the last-named clip operates, the gate being also provided above its pivotal support with a clip, which operates in connection with the other spring, and a lever-arm pivotally connected with said gate at or near its pivotal support, the upper end of which is provided with a flexible connection with the upper portion of the gate, said upper end of said lever-arm being also weighted, substantially as shown and described.

3. The combination with suitable gate-posts, of a gate pivoted at one of its lower corners to one of said posts and adapted to swing vertically, a segmental plate secured to said post and projecting in a direction opposite to that of the gate and provided with an angular clip, a corresponding segmental plate secured to the gate and provided at its outer end with a guide-clip through which the first-named segmental plate passes, and strong springs secured to the opposite sides of said posts in connection with one of which the said last-named clip operates, the gate being provided above its pivotal support with a clip which operates in connection with the other spring, said gate being also provided with a hinged section at its free end, substantially as shown and described.

In testimony that I claim the foregoing as my invention I have signed my name, in presence of the subscribing witnesses, this 29th day of October, 1898.

WILLIAM M. KENT.

Witnesses:
WILLIAM B. HOFF,
WILLIAM D. KOELSCH.